United States Patent [19]

Burwen

[11] 3,732,371

[45] May 8, 1973

[54] WIDE DYNAMIC RANGE NOISE MASKING COMPANDOR

[76] Inventor: Richard S. Burwen, 12 Holmes Road, Lexington, Mass. 02173

[22] Filed: May 10, 1971

[21] Appl. No.: 141,544

[52] U.S. Cl. ....................................179/1 R, 333/14

[51] Int. Cl. ...............................................H04b 1/64

[58] Field of Search .....................179/1 R, 15.55 TC, 179/15.55 R, 1 P, 15 AV; 333/14, 28 T

[56] References Cited

UNITED STATES PATENTS

| | | | |
|---|---|---|---|
| 3,350,512 | 10/1967 | Percival et al. | 333/14 |
| 2,395,758 | 2/1946 | Potter | 333/14 |
| 3,631,365 | 12/1971 | Dolby | 333/14 |
| 3,458,815 | 7/1969 | Becker | 333/14 |

FOREIGN PATENTS OR APPLICATIONS

| | | | |
|---|---|---|---|
| 1,015,856 | 9/1957 | Germany | 333/14 |

*Primary Examiner*—Ralph D. Blakeslee
*Attorney*—Weingarten, Maxham & Schurgin

[57] ABSTRACT

A noise masking compandor for greatly reducing the noise added to a wide dynamic range audio signal in passing through a noisy channel, such as a tape recorder. The audio signal, having a dynamic range of approximately 90 db, is compressed to a dynamic range of approximately 30 db for transmission through the noisy channel then subsequently expanded in a complementary fashion to its original 90 db range to provide a faithful reproduction of the original signal without noticeable noise. Compression and expansion result from high precision rectifiers to minimize distortion, and are further achieved without the need for maintaining precisely constant input and output levels for the noisy channel to avoid frequency response distortion. A high degree of high and low frequency signal preemphasis is provided in the compression and expansion characteristic without creating overload problems for the noisy channel.

24 Claims, 8 Drawing Figures

INVENTOR
RICHARD S. BURWEN

BY

Weingarten, Maxham & Schurgin

ATTORNEYS

INVENTOR
RICHARD S. BURWEN

BY

Weingarten, Maxham & Schurgin

ATTORNEYS

WIDE DYNAMIC RANGE NOISE MASKING COMPANDOR

FIELD OF THE INVENTION

The present invention relates to systems for providing reduction in effective audio noise and in particular to such systems utilizing companion techniques.

BACKGROUND OF THE INVENTION

The quality and fidelity of most audio components today have reached such a point of perfection that they contribute negligible noise and distortion in audio sound reproduction. A few components, however, notably the FM broadcast and reception channels and tape recorder record and playback channels, contribute very noticeable noise when used as part of an audio reproduction system. There is a limit to the maximum volume at which audio signals can be conveyed by an FM or tape recorder channel due to such factors as transmitter power limitations and FCC regulations in the case of FM broadcasting and electronic and tape saturation characteristics in the case of tape recorders. With an upper limit to channel volume established, audio passages of far lower volume are unable to mask the channel noise by drowning it out, and the noise contributed by FM and tape recorder channels at low volumes becomes an annoying distraction, particularly in the higher and lower frequency portions of the audio spectrum.

Since it is the maximum volume limit and dynamic range for the audio signal in passing through a noisy channel that causes low level audio signals to be ineffective in masking channel noise, a commonly practiced technique for reducing the effect of channel noise is to reduce the dynamic range of the audio signal in its passage through the noisy channel. This technique, commonly termed companion, is illustrated, for example, by U.S. Pat. Nos. 3,247,464; 3,350,515; and 3,458,815. Such systems were effective only to the extent that the substantial noise and distortion which they introduced themselves through the nonlinear signal processing employed were a smaller, negligible portion of the total noise being contended with in the audio reproduction system.

A further approach, is exemplified by the so-called Dolby "Audio Noise Reduction System." Such systems comprise a summing amplifier receiving, at one input, the audio signal to be transmitted over the noisy channel, and at the other summing input, a signal from a network which separates the audio input into four frequency ranges and amplifies the signal in each frequency range by a factor varying inversely with the audio signal in that frequency range. This system, by providing two summed signals to the noisy channel, one a straight through signal, has a nonlinear characteristic on a decibel scale. The philosophy of this system is that the straight through signal is dominant at high signal levels and minimizes the distortion resulting from high level signals and transitions between low level and high level signals. While this approach appears to be only partially successful in minimizing distortion it additionally is able to provide only a small degree of compression in the signal applied to the noisy channel, while requiring a greater range of variation in the gain of the network providing the second summing input to the summing amplifier. With a lower degree of compression achievable, a lower overall improvement in signal to noise ratio is achieved.

As in most known companion techniques, expansion of the signal recovered from the noisy channel is keyed to the level of the recovered signal or of a separate pilot tone. By compressing differently in four separate frequency bands according to the signal content of those frequency bands, and by using a logarithmically nonlinear compression technique significant frequency distortion can result if the signal level recovered from the noisy channel is not carefully adjusted to be identically the same as the signal level applied to the channel.

BRIEF SUMMARY OF THE INVENTION

These and other disadvantages are overcome by a noise reducing compandor according to the invention as illustrated by a preferred embodiment which provides compression of a 90 db input range into a 30 db range for application to a noisy channel and which subsequently provides expansion of the signal recovered from the noisy channel to provide the original 90 db range signal. The resulting improvement in signal to noise ratio is indicated by the decibel difference between the compressed and uncompressed signals and indicates that a 60 db improvement in signal to noise ratio is achieved.

Compression is provided by applying the input audio signal to a variable gain device having a gain control developed in a feedback relationship, from the compressed signal applied to the noisy channel. On the opposite end of the noisy channel, the recovered signal is expanded by a variable gain circuit operating with a gain control derived from the recovered signal in the same fashion as the control signal for the compression is developed.

The control signal is caused to vary over an input signal range of 90 db. Beyond that range compression and expansion are limited so that the variable gain elements act as simple amplifiers. Because of the wide dynamic range of input signals over which compression is effective, and because compression and expansion are identically and linearly controlled in decibels over the entire audio frequency range, there is no necessity to accurately maintain the levels of signals applied to and recovered from the noisy channel. Moreover, limits may be set on the range of variation of the control signal to achieve the compression and expansion functions which are tailored to particular channel characteristics such as different tape speeds. Compression and expansion may also be given different sensitivities at different frequencies to achieve specific emphasis results.

Most tape recorder and FM channel noise is in the relatively high and relatively low portions of the audio spectrum. Accordingly, preemphasis is supplied prior to compression, in these relatively higher and lower frequency portions. Complementary deemphasis is provided after expansion. The control signals for both compression and expansion are also preemphasized and the compressed signal is clipped to prevent net emphasis effects from causing excessive channel overloading.

For stereo or multiple channel reproduction, a single electronic system can be provided to develop a single control signal for compression and expansion that has the advantage of lower cost and the maintenance of stereo effect balance.

The gain control signal is developed for both compression and expansion by precision peak rectification which provides instantaneous peak signal tracking followed by precision signal filtration for minimum system distortion.

DESCRIPTION OF THE DRAWINGS

The present invention will be more fully understood by reference to the following detailed description of a preferred embodiment presented for purposes of illustration, and not by way of limitation, and to the accompanying drawings of which.

DETAILED DESCRIPTION OF THE PREFERRED EMBODIMENT

Figure 1:
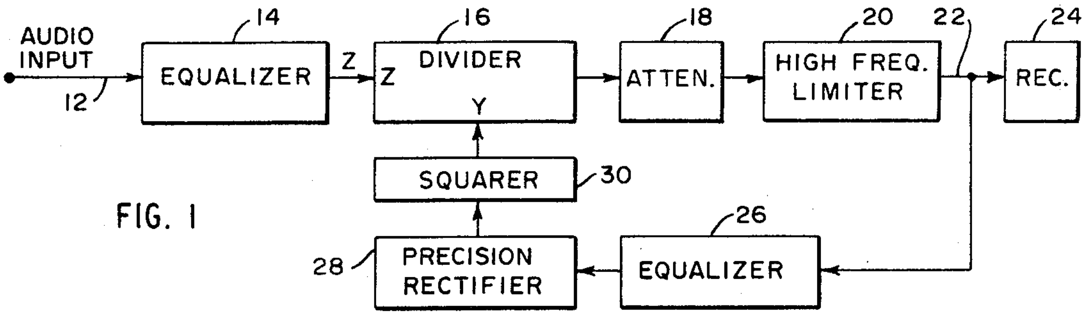
FIG. 1 is a block diagram of a compression system according to the invention for signals to be applied to a noisy channel.

Referring to FIG. 1 there is shown a block diagram representing the compression portion of a noise reducing compandor according to the invention. The audio input to be transmitted over the noisy channel is applied on a line 12 to an equalizer 14 providing high and low frequency preemphasis according to the asymptotic frequency response diagram of FIG. 3A. The output of the equalizer 14 is applied to the numerator or Z input of a divider 16. The output of the divider 16 is fed to a compensation circuit having a low frequency attenuator 18 and a high frequency limiter 20. The output of the high frequency limiter is applied on a line 22 to the input of the noisy channel 24, typically a tape recorder in the record mode. The low frequency attenuator 18 has a frequency response characteristic that causes attenuation in the audio signal below 50 Hz to reduce the effect of DC transients from the divider 16. Because of the initial preemphasis below 50 Hz from equalizer 14, FIG. 3A, the net response is flat. The high frequency limiter 20 is provided to clip high level, high frequency signals at an amplitude level which prevents them from causing an overload, such as magnetic tape saturation, in the noisy channel before the divider 16 has reacted to reduce the gain for such impulses.

Figures 3A, 3B, 3C:
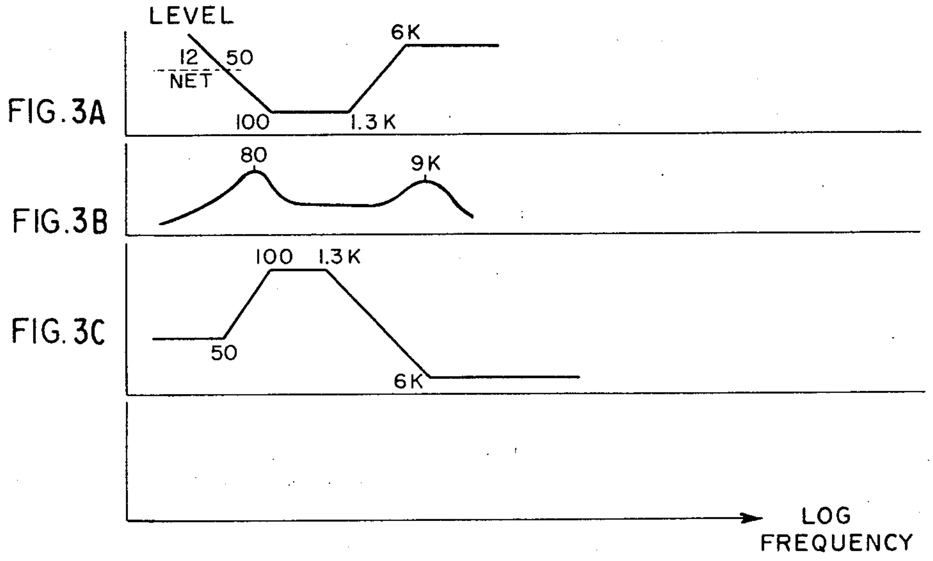
FIGS. 3A–3C are asymptotic frequency response diagrams useful for understanding the function of the invention.

The output of the high frequency limiter 20, as applied to the tape recorder or other noisy channel 24, is also conducted to an equalizer circuit 26 providing a frequency response characteristic indicated in FIG. 3B to provide, for example, approximately 5 db of boost about 80 Hz and selectably either 3, 12, or 20 db of boost about 9 KHz for respectively tape speeds of 15, 7.5, and 3.75 (or FM broadcasting) to compensate for preemphasis of the noisy channel so as to prevent overloading of the noisy channel.

The equalizer 26 provides attenuation below and above the 80 Hz and 9 KHz limits so that compression will not be erroneously affected by noise beyond these limits and to compensate for a tape recorder's inability to accurately follow signals in those low and high frequency portions. The output of the equalizer 26 is fed to a precision peak rectifier 28 which provides an output signal at a level corresponding to recent peak amplitudes in the signal applied to the recorder 24 as filtered by the equalizer 26. The peak rectified signal is fed to a squaring circuit 30 which provides an output control signal to the denominator or Y input of the divider 16 and which varies according to the square of the peak rectified signal level.

Mathematically, the signal applied to the recorder 24 varies over a dynamic range which is substantially the cube root of the dynamic range of the audio input signal on the line 12. This can be understood by considering the divider 16 as a variable gain amplifier, with the gain thereof varying inversely with the control signal. Since the control signal varies with the square of the divider output, the output of the divider is proportional to the divider Z input divided by the square of its output. Thus the cube of the divider output varies with the divider input. The output is thus the cube root of the divider signal input. This indicates that for an input audio signal range of 90 db the signal applied to the recorder 24 will vary over a range of 30 db.

The peak volume of the audio signal applied to the recorder 24 is limited by the recorder ability to respond without clipping or saturation to those signals. Without a compression system, the lowest level signals of the 90 db audio range would correspondingly be recorded at a level 90 db below that maximum limit. With the compression system indicated above, however, those lowest level audio input signals are only 30 db below the maximum signal level which may be applied to the recorder 24 and have accordingly achieved a 60 db gain over recorder noise from what would be experienced with signals of the lowest audio level applied to the recorder without compression. The resulting 60 db improvement in signal to noise ratio for the compression system according to the invention reduces the noise contributed by modern tape recorders, or FM broadcast and receiving systems, to the point of insignificance.

It is possible to recover the compressed signal from the tape recorder 24 or other noisy channel and amplify it directly for listening; and, in fact, according to some subjective evaluations, the results are very pleasing to listen to. Normally, however, a complementary expansion system, as shown in block diagram in FIG. 2 will be employed to restore the original audio signal dynamic range. The playback output of the tape recorder 24 is applied over a line 32 to a multiplicand or *x* input of a multiplier 34. The product output of the multiplier 34 is applied to an equalizer circuit 36 having frequency response characteristics as shown in FIG. 3C, and which are complementary characteristics to those of the equalizer 14 and attenuator 18 in order to eliminate the effect of preemphasis provided by the equalizer 14. The output of the equalizer 36 is used as a system output for direct amplification and utilization by, for example, a loud speaker.

The playback signal on line 32 is also applied to an equalizer 38 having the characteristics of FIG. 3B and thus being identical to the equalizer 26 of FIG. 1. The output of the equalizer 38 is fed to a precision peak rectifier 40 with its output conducted to a squaring circuit 42. The output of the squaring circuit 42 is applied to the multiplier or $y$ input of multiplier 34. The output of the squarer 42 is, accordingly, directly proportional to the output of the squarer 30 from FIG. 1 and is produced in response to the same signal as recovered from the recorder 24. It is important that the control signal fed to the multiplier 34 on the multiplier input is developed from the playback signal on line 32 in the same manner as the control signal fed to the denominator input of the divider 16 as developed from the signal applied to the recorder 24, if the original dynamic range and relative volume of the audio input signal are to be reproduced at the output of the equalizer 36.

Figure 2:
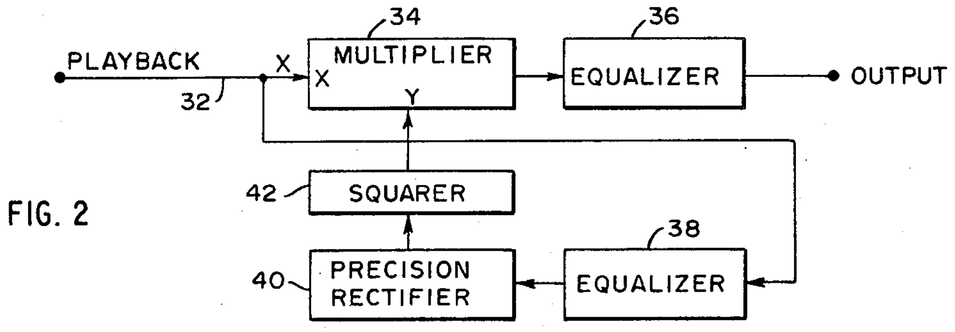
FIG. 2 is a signal expansion system operating complementary to the system of FIG. 1 on signals recovered from the noisy channel.

The output from the equalizer 36 as applied for further use by the system has a flat frequency response over the entire audio range. Also the compression and expansion systems of FIG. 1 and FIG. 2 provide exceptionally low distortion and high compression characteristics. There results a very significant, 60 db reduction in noticeable noise contributed by the noisy channel 24 without noticeable change in the reproduced signal from the equalizer 36.

Figure 4:
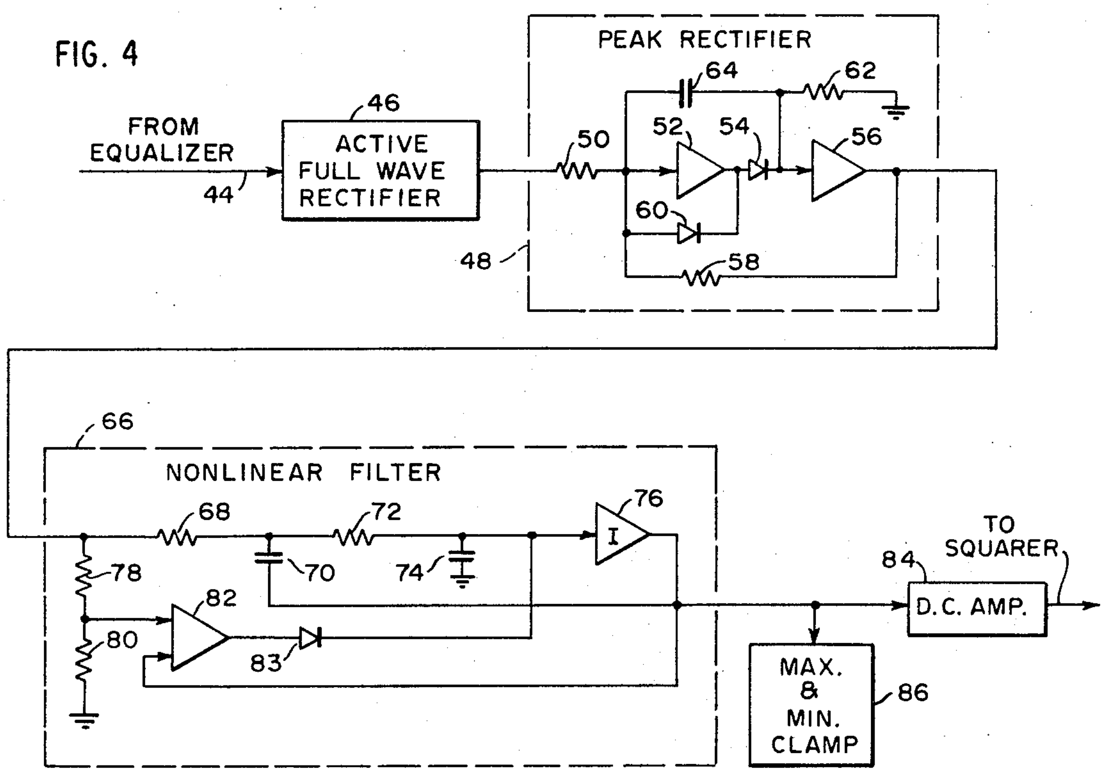
FIG. 4 is a partial block and partial schematic diagram of circuitry for developing control signals to establish the degree of compression and expansion in the circuitry of FIGS. 1 and 2.

The control signal for divider 16 and multiplier 34 contribute importantly to the reproduction quality of the comparison system as a whole. An exemplary precision rectifier for developing a control signal is illustrated in FIG. 4. The signal from equalizer 26 or 38 is applied over a line 44 to an active full wave rectifier 46. The rectifier 46 functions to provide a full wave rectified output of the signal from the equalizer and may have active circuitry providing amplification to overcome the turn on potential of the associated rectifiers in a manner similar to the systems of FIG. 4 described below.

The output of the active full wave rectifier 46 is applied to a peak rectifier 48 comprising a resistor 50 between the output of the rectifier 46 and an amplifier 52. The output of the amplifier 52 is fed through a diode 54 to the input of a unity gain amplifier 56. The output of the amplifier 56, the peak rectifier output, is fed back through a resistor 58 to the input of the amplifier 52. The input of the amplifier 52 is also conducted through a diode 60 in the positive current direction to the output of amplifier 52. From the input to the amplifier 56 a resistor 62 leads to ground and a capacitor 64 leads back to the input of the amplifier 52.

In operation, the peak rectifier 48 provides, as an output, a signal which responds rapidly and precisely to increases in magnitude peaks from the active full wave rectifier 46 but recovers relatively more slowly, in effect storing the level of the most recent peak from the rectifier 46. In specific operation, the amplifier 52, operating as an operational amplifier, maintains its input at virtual ground. To maintain this condition, current through the resistor 50 will be balanced by current supplied from three sources: through the capacitor 64; through the diode 60; and/or through the resistor 58. The diode 60 operates as a clamping diode to prohibit negative potentials at the output of the amplifier 52. At other times feedback from the unity gain amplifier 56 through the resistor 58 will be operative to balance current through the resistor 50 from the rectifier 46. When the resistor 58 supplies too much current, by reason of the charge on the capacitor 64 being large, the diode 60 provides clamping of the output of amplifier 52 to prevent it from a negative swing or, effectively to absorb some of the current from the resistor 58. When the resistor 58 provides insufficient current to balance current from the resistor 50 the charge on the capacitor 64 is increased by feedback current around amplifier 52 through diode 54, to supplement the feedback from the resistor 58 so as to balance the input current from the resistor 50. By placing diode 54 between amplifiers 52 and 56, the high gain of amplifier 52 eliminates turn on delays by diode 54 in the charging of capacitor 64 to allow precise peak rectification. The charging time for capacitor 64 is determined by the values of capacitor 64 and resistor 58 and preferably has a time constant of 0.3 milleseconds to allow a fast response to signal changes and significant immunity to short noise pulses. Discharge of the capacitor 64 through the resistor 62 produces a slow, gradual recovery for the peak rectifier from the peak signal level stored in the capacitor 64. The signal stored by capacitor 64 is provided, through the unity gain amplifier 56, as an output for the peak rectifier 48.

The output of the peak rectifier 48 is fed as input to a nonlinear filter 66. The nonlinear filter 66 receives this signal and applies it through a resistor 68 to a low-pass filter composes of a shunt capacitor 70 followed by a series resistor 72 and a further shunt capacitor 74. The high side of the capacitor 74 is conducted through a unity gain amplifier 76 to provide an output for the nonlinear filter 66. The output of the amplifier 76 is also conducted to the low side of capacitor 70, rather than connecting that terminal of the capacitor 70 to ground. The low side of the further capacitor 74 is, however, connected to circuit ground. The input to the nonlinear filter 66 is also conducted through a voltage divider composed of a resistor 78 and a resistor 80. The intermediate voltage point is conducted to a noninverting input of an amplifier 82. An inverting input of the amplifier 82 is fed from the output of the unity gain amplifier 76. From the output of the amplifier 82 a diode 83 is provided to conduct, in the positive direction, to the input of the amplifier 76.

In operation, the nonlinear filter 66 provides smoothing of the relatively jagged peaks from the peak rectifier 48 while at the same time enhancing the fast attack, slow recovery characteristics of the signal from the peak rectifier. In more detailed operation, whenever the input to the nonlinear filter exceeds by a predetermined percentage, established by resistors 78 and 80, the output of the amplifier 76, the amplifier 82 provides a signal through the diode 83 to the input of the amplifier 76, charging the capacitor 74, and increasing the output of the amplifier 76 until that predetermined percentage is no longer exceeded by the input. The gain of amplifier 82 eliminates the effect of the turn on potential of diode 83, thereby causing it to operate as an ideal diode and providing an instantaneous input to amplifier 76 where the input to the nonlinear filter exceeds the predetermined percentage. Feedback from the output of the amplifier 76 to the low side of the capacitor 70 allows the $\pi$ filter to respond more rapidly to increasing signals at the input of the nonlinear filter 66. In the case when the input to the nonlinear filter does not exceed its output by the predetermined percentage, the $\pi$ filter provides smoothing to the peaks from the rectifier 48. Only when a relatively large increase in signal level is fed to the nonlinear filter, does it respond rapidly.

The output of the nonlinear filter 66 is fed to a DC amplifier 84 and in turn to the squarer 30 or 42. Shunting the input to the DC amplifier 84 is a maximum and minimum signal level clamping circuit 86 which limits the range of signal levels at the output of the nonlinear filter 66 to predetermined maximum and minimum levels in manners well known in the art.

Figure 5:
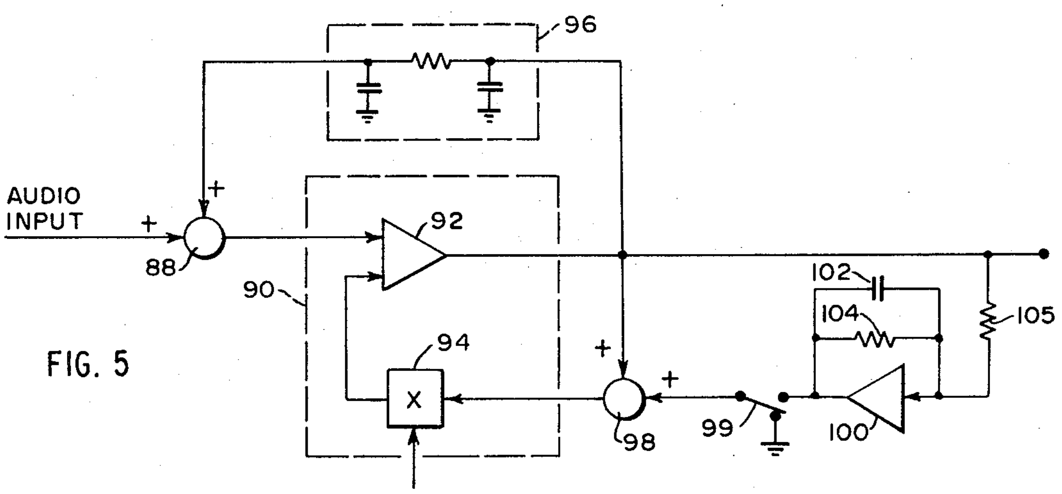
FIG. 5 is a partial block and partial schematic diagram of a signal compression device operative to eliminate offset signal shifts during control signal variation.

A divider, like the divider 16 used in FIG. 1 to provide signal compression, normally has a tendency to produce a DC level shift at its output in response to a rapid change in the level of the control signal applied as a denominator input. Such behavior produces noticeable disturbances in the audio signal ultimately reproduced, especially if there is no expansion. In FIG. 5, a divider is shown with additional circuitry functioning to minimize DC output level shifts in response to control signal changes. The audio input is applied to a summer 88 and from the summer 88 is applied to a divider circuit 90. Within the divider 90 an amplifier 92 receives on one input the output of the summer 88 and on a second input the output of a multiplying circuit 94. The output of the amplifier 92 is returned to a further input of the summer 88 through a low-pass, $\pi$ filter 96. The output of the amplifier 92 is further fed to one input of a summer 98 with the output of the summer 98 fed to the multiplicand input of the multiplier 94. A further summing input of summer 98 is grounded through a switch 99. Alternatively the switch 99 causes the further input to summer 98 to be supplied from an integrating amplifier 100 having a feedback capacitor 102 and parallel resistor 104 therearound. The amplifier 100 receives as input the output of amplifier 92 through a resistor 105. The multiplier input to multiplier 94 is supplied by the control signal from squarer 30.

In operation, the low-pass filter 96 maintains the DC levels at the input and output of amplifier 92 at the same level by providing DC negative feedback. With alternative amplifier 100 operating in the system, a slight DC offset that might occur particularly when the divider 90 is operating at a low gain level is minimized by feedback DC stabilization provided through the integrating amplifier 100 and summer 98. Thus when the control signal suddenly drops, and the gain of the divider 90 increases, the tendency of the otherwise existing small DC offset to be magnified and produce a noticeable DC level jump at the output of the divider 90 is reduced. What DC level shift does result is diminished by the attenuator 18 in FIG. 1.

A further feature of the invention is the ability to limit the input signal level range over which compression and resulting expansion are achieved. This function is provided by the limits set in the maximum and minimum signal level clamping circuit 86. With one set of limits an input signal range of 90 db is provided over which compression and expansion operate to produce a compressed signal having a 30 db range for transmission over the noisy channel. With these limits, a 60 db improvement in signal to noise ratio is achieved. Examples of applications for this set of limits include use with high quality tape recording such as with tape speeds of 7½, or higher, inches per second.

In other situations, such as with FM broadcasts or prerecorded tapes, particularly at slow speeds, it is desirable to limit the range of input signals over which compression and corresponding expansion occur to make the compressed signals more pleasant to listen to with receiving and playback equipment that is not equipped with expansion electronics while at the same time preserving a significant degree of noise reduction. In this case of listening without expansion, low levels are reproduced at a higher level to provide a more constant sound level for casual listening.

Figure 6:
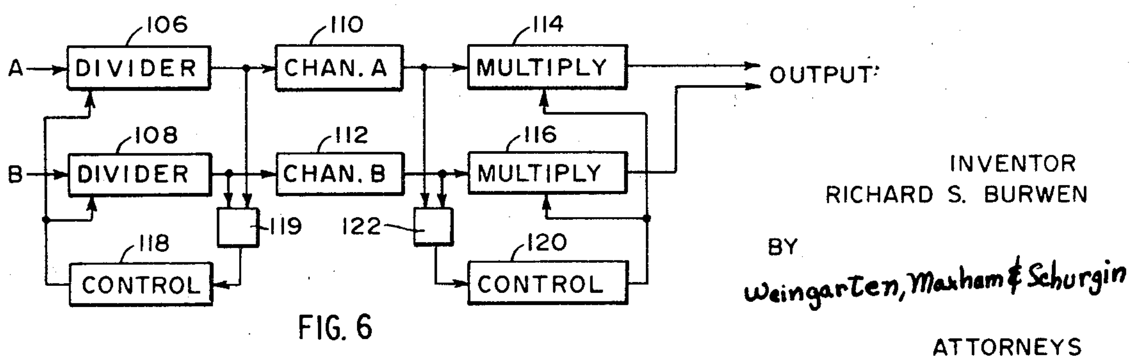
FIG. 6 is a block diagram of a two channel noise reducing system according to the invention providing coordinated development of the control signal for both channels.

Common to many audio systems today is the provision of two or more audio signal channels to produce a spatial or stereo effect. When compansion is used in a multi-channel system, it is preferable to alter the manner in which the control signals are developed as indicated in FIG. 6. Shown there, separate A and B audio signal channels are provided having respective dividers 106 and 108, noisy channels 110 and 112, and multipliers 114 and 116. A control circuit 118 is provided to receive the output of the dividers 106 and 108 and to develop a single control signal for application to denominator inputs of the dividers 106 and 108. The control circuit 118 contains a peak rectifier and squarer, and preferably an equalizer as indicated for FIGS. 1 and 2. Additionally, control circuit 118 is provided with an input network 119 to sum the outputs of the two dividers or select the higher of the outputs of the dividers 106 and 108. In either case, a single control signal is developed which provides identical compression characteristics to the two dividers.

Similarly on the expansion side, a single control circuit 120 is provided receiving as input the signals recovered from the A and B noisy channels 110 and 112 through an input network 122 identical to network 119. A single control is developed by the control circuit 120 and applied as multiplier inputs to the multipliers 114 and 116. The control circuit 120, processes the signals recovered from the A and B noisy channels 110 and 112 in the same manner as control circuit 118.

The advantages of deriving a single control signal for a multiple channel audio system, as indicated in FIG. 6, is not only economy of components but also the elimination of any tendency for the two channels to become unbalanced when listened to without expansion.

An additional feature of the invention is produced by adjusting the degree of high and low frequency preemphasis provided by the equalizers 26 and 38 in FIG. 1 and FIG. 2 so that the range of signal levels over which compression occurs can be altered relatively between high and low frequency portions of the received audio spectrum. Yet, because only one control signal is derived for compression and expansion, there is no possibility for frequency response distortion if the recorder or noisy channel has a gain characteristic which causes the recovered signal to have a different amplitude than the signal applied to the noisy channel.

Another feature of the invention is the alteration of the manner in which the control signals for compression and expansion are developed to provide an enhanced crescendo effect. By providing more high frequency and low frequency preemphasis in the expansion equalizer 38 than in the compression equalizer 26, the signal expansion can be increased for increased output during crescendo passages which normally have substantial high frequency and low frequency content. Increased response to high and low frequencies can be alternatively incorporated in the noisy channel.

Specific alternatives may be advantageous to the above circuitry depending upon individual realizations of the circuitry. The filter 96 in FIG. 5 may benefit from a damping resistance in either capacitor to suppress oscillations due to the substantial DC feedback provided thereby. Also, the multiplier 94 used in FIG. 5, with or without DC shift reduction, and the multiplier 34 of FIG. 2 are preferably based on the design indicated in the *Fairchild Semiconductor Linear Integrated Circuits Application Handbook*, FIG. 10, pp. 151–153 modified with $\mu$ A715 amplifiers and diode linearization and temperature compensation at the input to the differential pair. If less dynamic range is required other, preferably two quadrant multipliers may be used.

Having described above preferred embodiments of the invention, it will occur to those skilled in the art that other alterations and modifications can be made to the circuitry disclosed without departing from the spirit of the invention. Accordingly, it is intended to limit the scope of the invention only as indicated in the following claims.

What is claimed is:

1. A noise masking compandor for minimizing the effect of noise in a noisy system, said compandor comprising:
   - means for receiving a signal to be applied to said noisy system;
   - means for preemphasizing predetermined portions of the frequency range of said received signal;
   - means for compressing said received signal as preemphasized by amplification of generally all frequencies thereof to a degree inversely representative of a control signal to provide an approximately 1 db change in compressed signal level for each at least 3 db of change in received signal level;
   - means for developing said control signal in response to the output of said compressing means;
   - said control signal causing said compressing means to provide amplification of said received, preemphasized signal which decreases with the output of said compressing means;
   - means for causing the development of said control signal to be responsive more to predetermined portions of the frequency range of the output of said compressing means;
   - means for applying the output of said compressing means to said noisy system and for recovering the output of said compressing means from said noisy system;
   - means for expanding said compressed, recovered signal in response to a further control signal;
   - means for developing said further control signal for said expansion means from said compressed, recovered signal in a manner similar to the development of the first control signal; and
   - means for complementing the preemphasis in the output of said signal expanding means with a frequency response characteristic providing substantial restoration of the frequency components of said received signal.

2. The compandor of claim 1 further including means for limiting the amplitude excursion of signals at the output of said compressing means thereby to prevent excessive signal levels from reaching said noisy system in response to relatively high frequency transients in said received signal.

3. The compandor of claim 1 wherein said preemphasizing and complementing means provide respectively boost and attenuation to both relatively high and relatively low frequency portions of said received signal and the output of said expanding means.

4. The compandor of claim 1 wherein said means for causing said control signal to respond more to predetermined portions of said frequency range decreases the response of said control signal to portions of the frequency range of said received signal to which said noisy system responds relatively less accurately.

5. A signal compression system of the type operative with a compandor for masking noise in a noisy system, said compression system including:
   - means for receiving a signal to be applied to said noisy system;
   - means for dividing said received signal by a control signal;
   - means for developing said control signal to represent and vary with the output of said divider means; and
   - feedback control means for detecting and reducing the DC level at the output of said divider thereby to reduce DC level shifts in response to changes in said control signal.

6. The compression system of claim 5 wherein:
   - said divider means is of the type having an amplifier receiving as input the signal to be divided and providing as output the quotient of said input and said control signal;
   - said amplifier having its output fed back to its input through a multiplier receiving as multiplier and multiplicand inputs said control signal and the output of said amplifier respectively;
   - said means for reducing DC level shifts at the output of said divider in response to changes in said control signal includes a filter providing DC negative feedback between the output and the input of said amplifier.

7. The compression system of claim 6 further including signal storage feedback means for minimizing the DC level at the output of said amplifier to reduce DC level shifts at the output of said divider in response to decreases in said control signal.

8. The signal compression system of claim 5 further including:

cascade filter means for attenuating low frequency components in the output signal of said divider means; and means for preemphasizing low frequency components in said received signal to provide, with said attenuating means, net preemphasis of low frequencies and attenuation of DC level shifts from said divider.

9. An expansion system of the type operative with a compandor for masking noise in a noisy system, said expansion system comprising:

means for recovering a signal from said noisy system in a compressed form;

means for expanding said recovered signal in response to a control signal;

means for developing said control signal in response to said recovered compressed signal to provide expansion of said recovered, compressed signal complementary to the compression thereof;

said developing means being operative to augment the expansion of said expanding means in response to high volume components at predetermined frequencies in said recovered, compressed signal thereby to augment crescendo effects in the expansion of said recovered, compressed signal.

10. In a noise masking compandor of the type having signal compression and signal expansion systems for respectively applying a compressed signal to and recovering a compressed signal from a noisy channel, means for developing a control signal for said expansion and compression systems including:

means responsive to said compressed signal for providing precise peak rectification thereof;

means for filtering the rectified signal to provide said control signal;

the filtered rectified signal having fast attack and slow decay characteristics;

means for causing the fast attack characteristic to be operative in response to increases in said compressed signal in excess of predetermined percentages of the filtered, rectified signal; and means for providing in said fast attack characteristic reduced rectification switching delay and relatively fast response time with respect to the rates of variation of said received signal.

11. The system of claim 10 further including means for amplitude limiting of said compressed signal above a predetermined signal amplitude thereby to prevent overloading of said noisy channel before said control signal is effective to produce a signal amplitude reduction through said signal compression system.

12. The system of claim 10 wherein said compandor includes:

a plurality of signal channels with respective signal compression and signal expansion systems;

each of said respective signal compression means being operative in response to the same control signal;

each of said respective signal expansion means being operative in response to the same control signal; and means for combining the compressed signals applied to and for combining the compressed signals recovered from each of said signal channels to produce respective single compressed signals for developing said control signals for compression and expansion.

13. The system of claim 12 wherein said compressed signals combining means includes a summing network.

14. The system of claim 12 wherein said compressed signals combining means includes means for selecting as each of said single compressed signals the highest of the compressed signals applied to and the highest of the compressed signals recovered from each of said signal channels.

15. The system of claim 10 further including means for limiting the amplitude range of said control signal to signal levels between predetermined upper and lower signal level limits thereby to produce compansion over a substantially limited range of signal levels.

16. The compansion system of claim 10, further including one or more compression system means for causing said control signal to be developed over a limited range of signal levels which provides for significant improvement in signal to noise ratio and for pleasant sound reproduction of said compressed signal without signal expansion.

17. In a noise masking compandor of the type having signal compression and signal expansion systems for respectively applying a compressed signal to and recovering a compressed signal from a noisy channel, means for developing a control signal for said expansion and compression system including:

an operational amplifier receiving said compressed signal;

means for providing buffer amplification;

first means for providing rectification connected between the output of said operational amplifier and said buffer amplifying means;

second means for providing rectification connected between the input and output of said operational amplifier with the connection between said first and second rectifying means being between terminals thereof which are of opposite characteristics;

signal storage means connected between the input of said buffer amplifying means and the input of said operational amplifier;

said signal storing means having a slow decay characteristic;

negative signal feedback means connected between the output of said buffer amplifying means and the input of said operational amplifier;

means for receiving the output of said buffer amplifying means and providing parallel low-pass filtering thereof and attenuation to a predetermined percentage;

second buffer amplifying means responsive to said low-pass filtered signal for providing as an output thereof said control signal;

difference amplifying means for amplifying the difference between said signal attenuated to a predetermined percentage and the output of said second buffer amplifying means; and means for rectifying the output of said difference amplifying means and for conducting the output of said difference amplifying means to the input of said second buffer amplifying means whenever said signal attenuated to a predetermined percentage exceeds the output of said second buffer amplifying means.

18. The system of claim 17 further including feedback means from said buffer amplifying means to said low-pass filtering means for causing a more rapid response by said low-pass filtering means.

19. In a noise masking compandor of the type having signal compression and signal expansion systems for respectively applying a compressed signal to and recovering a compressed signal from a noisy channel having emphasis of predetermined frequencies, means for developing a control signal for said expansion and compression system including:

signal equalizing means responsive to said compressed signal for providing relative signal enhancement at frequencies in which said noisy channel has emphasis and providing relative signal attenuation to frequencies at which said noisy channel has relatively inaccurate signal response characteristics; and means for fast attack, slow decay peak rectification of said equalized signal to provide said control signal.

20. The system of claim 19 adapted for audio frequency range compression and expansion and wherein said signal equalizing means includes means for providing its relative signal enhancement at generally high frequency and generally low frequency portions of the audio frequency range and to provide its relative signal attenuation at generally higher frequencies and generally lower frequencies respectively as compared to said frequencies of signal enhancement.

21. The system of claim 19 further including:

means for providing signal preemphasis in advance of the application of said compressed signal to said noisy channel;

means for providing signal deemphasis complementary to said signal preemphasis after signal expansion;

the frequencies of signal preemphasis and deemphasis being at least partially coextensive with the frequencies of relative signal enhancement of said equalizing means.

22. A noise masking signal compression system for minimizing the effect of noise in a noisy channel having prescribed preemphasis, said system comprising:

means for receiving a signal to be transmitted by said noisy channel;

means for preemphasizing predetermined frequencies of said received signal;

means for amplifying the preemphasized signal to provide an amplified output in response to a control signal;

said amplifying means including a feedback path having a multiplier responsive to both the amplified output and said control signal;

means for attenuating low frequency portions of the variably amplified signal to provide in combination with said preemphasizing means, net low frequency emphasis;

means for amplitude limiting the variably amplified signal to prevent overloading of said noisy channel;

means for applying the attenuated, limited signal to said noisy channel;

means for emphasizing said applied signal at frequencies at least partly corresponding to frequencies preemphasized by said noisy channel;

means for providing precision, full wave, peak rectification of said emphasized signal with fast attack and slow decay characteristics;

said fast attack characteristic having a response with reduced rectification switching delay and having a response time as fast as all but the fastest varying portions of said received signal;

means for nonlinearly filtering said peak rectified signal to provide low-pass filtering thereof in response to variations in said peak rectified signal which do not exceed said low-pass filtered signal by a predetermined percentage and to provide fast attack response to variations in said peak rectified signal which do exceed said low-pass filtered signal by said predetermined percentage; and means for squaring said nonlinearly filtered signal to produce said control signal.

23. The noise masking signal compression system of claim 22 wherein said control signal is limited in amplitude range to cause compression of a fractional portion of the amplitude range of said received signal.

24. The noise masking signal compression system of claim 22 including:

means for recovering said applied signal from said noisy channel; and means for expanding an equalizing said recovered signal with a characteristic complementary to the compression, low frequency attenuation and preemphasis of said received signal; and means for augmenting expansion of said recovered signal to provide augmented crescendo effects.

* * * * *